United States Patent
Takakura et al.

(10) Patent No.: US 9,026,383 B2
(45) Date of Patent: May 5, 2015

(54) FLOW RATE SENSOR

(75) Inventors: Hiroshi Takakura, Kyoto (JP); Shohei Yamano, Kyoto (JP); Hiroyuki Ebi, Kyoto (JP)

(73) Assignee: Horiba STEC, Co., Ltd., Kyoto-shi (JP)

( * ) Notice: Subject to any disclaimer, the term of this patent is extended or adjusted under 35 U.S.C. 154(b) by 527 days.

(21) Appl. No.: 13/499,239

(22) PCT Filed: Sep. 24, 2010

(86) PCT No.: PCT/JP2010/066539
§ 371 (c)(1),
(2), (4) Date: Mar. 29, 2012

(87) PCT Pub. No.: WO2011/040327
PCT Pub. Date: Apr. 7, 2011

(65) Prior Publication Data
US 2012/0191381 A1    Jul. 26, 2012

(30) Foreign Application Priority Data

Sep. 30, 2009 (JP) .................. 2009-228794

(51) Int. Cl.
*G01F 1/698* (2006.01)
*G01F 1/684* (2006.01)

(52) U.S. Cl.
CPC .............. *G01F 1/698* (2013.01); *G01F 1/6847* (2013.01)

(58) Field of Classification Search
CPC ...................................................... G01F 1/698
USPC .......................................................... 702/47
See application file for complete search history.

(56) References Cited

U.S. PATENT DOCUMENTS

| 5,817,932 | A | | 10/1998 | Nishimura et al. |
| 6,125,695 | A | * | 10/2000 | Alvesteffer et al. ....... 73/204.27 |

(Continued)

FOREIGN PATENT DOCUMENTS

| CN | 1184249 | 6/1998 |
| CN | 1210981 | 3/1999 |

(Continued)

OTHER PUBLICATIONS

Japanese Patent Office, Office Action Issued in Japanese Patent Application No. 2010-537980, Jun. 17, 2014, 3 pages.

(Continued)

*Primary Examiner* — Bryan Bui
(74) *Attorney, Agent, or Firm* — Alleman Hall McCoy Russell & Tuttle LLP

(57) ABSTRACT

A flow rate sensor is disclosed, comprising a flow rate calculation part that calculates a flow rate of a fluid based on an expression using $X_d/X_u$ that satisfies an expression at least in a certain range of the flow rate when an output of a constant temperature control circuit corresponding to an upstream resistor is defined as $V_u$, an output of a constant temperature control circuit corresponding to a downstream resistor is defined as $V_d$, and the flow rate is defined as and the flow rate calculation part corrects the zero point output as being an output when the flow rate is zero by using a zero offset function (OFS) defined as a function of $V_u + V_d X_d/X_u$.

5 Claims, 5 Drawing Sheets

(56) References Cited

U.S. PATENT DOCUMENTS

| | | |
|---|---|---|
| 7,168,312 B2 | 1/2007 | Akamatsu |
| 7,565,836 B2 | 7/2009 | Sukegawa et al. |
| 7,814,785 B2 * | 10/2010 | Sukegawa et al. ......... 73/204.27 |
| 2009/0090177 A1 * | 4/2009 | Sukegawa et al. ......... 73/204.25 |
| 2010/0037688 A1 | 2/2010 | Inoue et al. |

FOREIGN PATENT DOCUMENTS

| | | |
|---|---|---|
| CN | 1704733 | 12/2005 |
| CN | 101013043 A | 8/2007 |
| CN | 101055203 A | 10/2007 |
| CN | 201034658 Y | 3/2008 |
| EP | 0902261 A1 | 3/1999 |
| JP | 62132120 A | 6/1987 |
| JP | H0523605 B2 | 4/1993 |
| JP | 05149767 | 6/1993 |
| JP | 05281007 | 10/1993 |
| JP | 10009919 | 1/1998 |
| JP | 2007205916 | 8/2007 |
| TW | 200745805 | 12/2007 |
| TW | 200839197 A | 10/2008 |

OTHER PUBLICATIONS

ISA Japan, International Search Report of PCT/JP2010/066539, Nov. 16, 2010, WIPO, 1 page.

Taiwanese Patent Office, Search Report and Office Action of Taiwanese Patent Application No. 099132626, Mailed Sep. 12, 2014, 4 pages.

* cited by examiner

FLOW RATE SENSOR

TECHNICAL FIELD

This invention relates to a flow rate sensor that measures a flow rate of a fluid flowing in a channel.

BACKGROUND ART

The flow rate sensor disclosed in patent document 1 represents a conventional art of a flow rate sensor. The flow rate sensor disclosed in patent document 1 is so arranged that two resistive elements whose resistance value changes in accordance with a temperature of a fluid are arranged mutually independently in an upstream side and a downstream side of a channel where the fluid flows, and two constant temperature control circuits, each of which contains the resistive element, respectively, are arranged mutually independently so that a temperature of the resistive element is continually controlled to be constant and equal by the constant temperature control circuits, and calculates a flow rate (Q) based on an expression, $(V_u - V_d)/(V_u + V_d)$, where an output of, the constant temperature control circuit corresponding to the upstream resistive element is defined as $V_u$, and an output of the constant temperature control circuit corresponding to the downstream resistive element is defined as $V_d$.

The reason why the above-mentioned expression is used is because it is considered that $V_u + V_d$ is an amount influenced by the ambient temperature alone and an increasing rate (a gradient) of the output of the flow rate sensor relative to a change of the actual flow rate (Q) can be made at a constant value, irrespective of the ambient temperatures, by conducting division by $V_u + V_d$ so that the linearity of the output of the flow rate sensor can be improved and the error can be made further smaller.

However, since practically the absolute value of the gradient of the output $V_u$ of the constant temperature control circuit relative to the flow rate (Q) is different from the absolute value of the gradient of the output $V_d$ of the constant temperature control circuit relative to the flow rate (Q) as shown in FIG. 5, $V_u + V_d$ does not take a constant value relative to the flow rate (Q) and $V_u + V_d$ is a value that varies in accordance with the flow rate (Q).

As a result of this, although it is possible for the above-mentioned calculation to lessen an influence from the ambient temperature on the output of the flow rate sensor, another non-linearity is added by the influence from the change of the flow rate (Q) because the output is divided by $V_u + V_d$ so that the linearity of the output of the flow rate sensor can not be improved and the error can not be smaller.

In order to solve these problems, patent document 2 suggests that the above-mentioned expression be changed to $(V_u - V_d)/(\alpha V_u + \beta V_d)$, where $(0 \leq \alpha, \beta \leq 1, \alpha \leq \beta)$ so that the influence from the change of the flow rate (Q) is reduced and the linearity of the output of the flow rate sensor is improved.

However, even though the flow rate sensor described in patent document 2 is arranged so that the increasing rate (the gradient) of the output of the flow rate sensor relative to the change of the actual flow rate (Q) is difficult to change relative to the ambient temperature, the error still remains because the increasing rate is influenced by the change of the flow rate (Q).

In addition, neither patent document 1 nor patent document 2 considers how to correct the zero point output in a state where the flow rate (Q) is zero. As a result of this, since the shift amount of the sensor output changes largely relative to the ambient temperature change, the change of the shift amount is considered to be a part of the reason for an error in the output of the flow rate sensor.

PRIOR ART DOCUMENT

Patent document 1: Japanese Examined Patent Application Publication No. 5-23605
Patent document 2: Japanese Unexamined Patent Application Publication No. 5-281007

DISCLOSURE OF THE INVENTION

Problems to be Solved by the Invention

The present claimed invention intends to solve all of the problems discussed above and a main object of this invention is to provide a flow rate sensor whose linearity is improved and whereby errors are kept small by preventing an influence from the change of the flow rate on the output of the flow rate sensor and by conducting temperature correction on the zero point output that has not been considered.

Means to Solve the Problems

More specifically, a flow rate sensor of the present claimed invention is so arranged that two resistive elements, whose resistance values change in accordance with a temperature of a fluid, are arranged in an upstream side and a downstream side of a channel where the fluid flows, and two constant temperature control circuits, each of which contains these resistive elements, respectively, are arranged so as to control a temperature of the resistive elements to be constant by the constant temperature control circuits, and is characterized by comprising a flow rate calculation part that calculates a flow rate (Q) of the fluid based on an expression (Expression 2) using $X_d/X_u$ that satisfies an expression (Expression 1) at least within a range of the flow rate (Q) when an output of the constant temperature control circuit corresponding to the upstream resistive element is defined as $V_u$, an output of the constant temperature control circuit corresponding to the downstream resistive element is defined as $V_d$, and the flow rate of the fluid is defined as (Q), and the flow rate calculation part corrects a zero point output as being an output when the flow rate (Q) is zero by using a zero offset function (OFS) defined as a function of $V_u + V_d X_d/X_u$.

$$\left| \frac{dV_u}{dQ} \right| = \left| \frac{d(V_d X_d / X_u)}{dQ} \right| \quad \text{[Expression 1]}$$

$$Q = \left( \frac{V_u - V_d}{V_u + V_d X_d / X_u} + OFS \right) SENSx \quad \text{[Expression 2]}$$

where (OFS) is the zero offset function, and (SENSx) is a conversion function that converts a calculation value of an output from each constant temperature control circuit into a flow rate.

In accordance with this arrangement, since plus and minus of the gradient of $V_u$ relative to the flow rate (Q) is ordinarily different from that of the gradient of $V_d$ relative to the flow rate (Q) as shown in FIG. 5, and $V_u$ and $V_d X_d/X_u$ have the same gradient based on the expression (Expression 1), a term regarding the flow rate (Q) is eliminated in $V_u + V_d X_d/X_u$. In short, it is possible to make $V_u + V_d X_d/X_u$ at a value that does not change relative to the flow rate (Q) and that changes largely by the ambient temperature change alone. Accordingly, it is possible to make $(V_u - V_d)/(V_u + V_d X_d/X_u)$ in the expression (Expression 2) at a value whose influence alone relative to the ambient temperature change is corrected so that it is possible to prevent adding another non-linearity due to an influence from the change of the flow rate (Q) based on this calculation. In other words, it is possible to prevent the increasing rate (the gradient) of the output of the flow rate sensor relative to the change amount of the flow rate (Q) from changing relative to the flow rate.

In addition, since the zero point output of $(V_u-V_d)/(V_u+V_dX_d/X_u)$ is corrected by the zero off-set function (OFS) that is defined as a function of $V_u+V_dX_d/X_u$ that receives an influence of the ambient temperature alone, it is possible to correct the shift amount of the sensor output that changes in relation with the ambient temperature.

As mentioned, since the output of the flow rate relative to the change of the flow rate (Q), the increasing rate of the output, especially, can be prevented from being changed, and the shift amount can be also corrected, it is possible to improve the linearity of the sensor output so that a flow rate sensor with less error can be provided.

The above-mentioned expression (Expression 2) includes not only $V_u+V_dX_d/X_u$ but also, for example, $V_uX_u/X_d+V_d$. Concretely, it is clear that equation transformation such as an expression (Expression 3) can be conducted.

$$Q = \left(\frac{V_u - V_d}{V_u + V_dX_d/X_u} + OFS\right)SENx \quad \text{[Expression 3]}$$

$$= \left(\frac{\frac{X_u}{X_d}(V_u - V_d)}{\frac{X_u}{X_d}V_u + \frac{X_u}{X_d}\frac{X_d}{X_u}V_d} + OFS\right)SENSx$$

$$= \left(\frac{V_u - V_d}{V_uX_u/X_d + V_d} + \frac{X_d}{X_u}OFS\right)\frac{X_u}{X_d}SENSx$$

$$= \left(\frac{V_u - V_d}{V_u - X_u/X_d + V_d} + OFS'\right)SENSx'$$

where $(X_d/X_u)$ OFS=OFS', $(X_u/X_d)$ SENSx=SENSx'. In addition, the zero offset function includes not only $V_u+V_dX_d/X_u$ but also $V_uX_u/X_d+V_d$.

In order to make it possible to calculate the flow rate (Q) more accurately, the flow rate calculation part may calculate the flow rate (Q) by the use of the conversion function (SENSx) defined as a function of $V_u+V_dX_d/X_u$.

In order to correct temperature dependence on the ambient temperature that remains in $(V_u-V_d)/(V_u+V_dX_d/X_u)$ so as to make it possible to calculate a more accurate flow rate (Q), it is preferable that the flow rate calculation part calculates the flow rate (Q) based on an expression [Expression 4] wherein a temperature correction term is further added to the expression [Expression 2].

$$Q = \left\{\frac{V_u - V_d}{V_u + V_dX_d/X_u}\left[1 + a\left(\frac{V_u + V_dX_d/X_u}{V_{ut} + V_{dt}X_{dt}/X_{ut}}\right)\right] + OFS\right\}SENSx \quad \text{[Expression 4]}$$

where $V_{ut}$ is an output at a previously measured predetermined temperature of the constant temperature control circuit corresponding to the upstream resistive element, $V_{dt}$ is an output at a previously measured predetermined temperature of the constant temperature control circuit corresponding to the downstream resistive element, and $X_{dt}/X_{ut}$ satisfies the expression [Expression 1] regarding $V_{ut}$, $V_{dt}$.

As a concrete embodiment, it is preferable that the conversion function (SENSx) is a calibration curve.

Since $V_u+V_dX_d/X_u$ is a value that is hardly influenced from the flow rate (Q) and that depends largely on the temperature, it is conceivable to use $V_u+V_dX_d/X_u$ as a thermometer. In other words, if the mass flow sensor further comprises a temperature calculation part that calculates an ambient temperature based on $V_u+V_dX_d/X_u$, it is possible to measure the ambient temperature based on the output from the constant temperature control circuit alone without providing an additional temperature sensor and to utilize the flow rate sensor for various corrections or control.

Effect of the Invention

In accordance with the flow rate sensor of this invention, the increasing rate (the gradient) of the output of the flow rate sensor can be corrected not to change relative to the ambient temperature change and the non-linearity resulting from the change of the flow rate (Q) relative to the output of the flow rate sensor can be prevented from being added by $V_u+V_dX_d/X_u$ that hardly changes relative to the flow rate change and largely changes relative to the ambient temperature change. Furthermore, the zero point output is also corrected by the zero offset function (OFS) as being the function of $V_u+V_dX_d/X_u$ so that it is possible to prevent variation of the shift amount depending on the temperature. Accordingly, it is possible to make a highly accurate flow rate sensor that is resistant to being affected by not only the ambient temperature change of the flow rate sensor but also the flow rate change.

DETAILED DESCRIPTION OF THE EMBODIMENTS OF THE INVENTION

Figure 1:
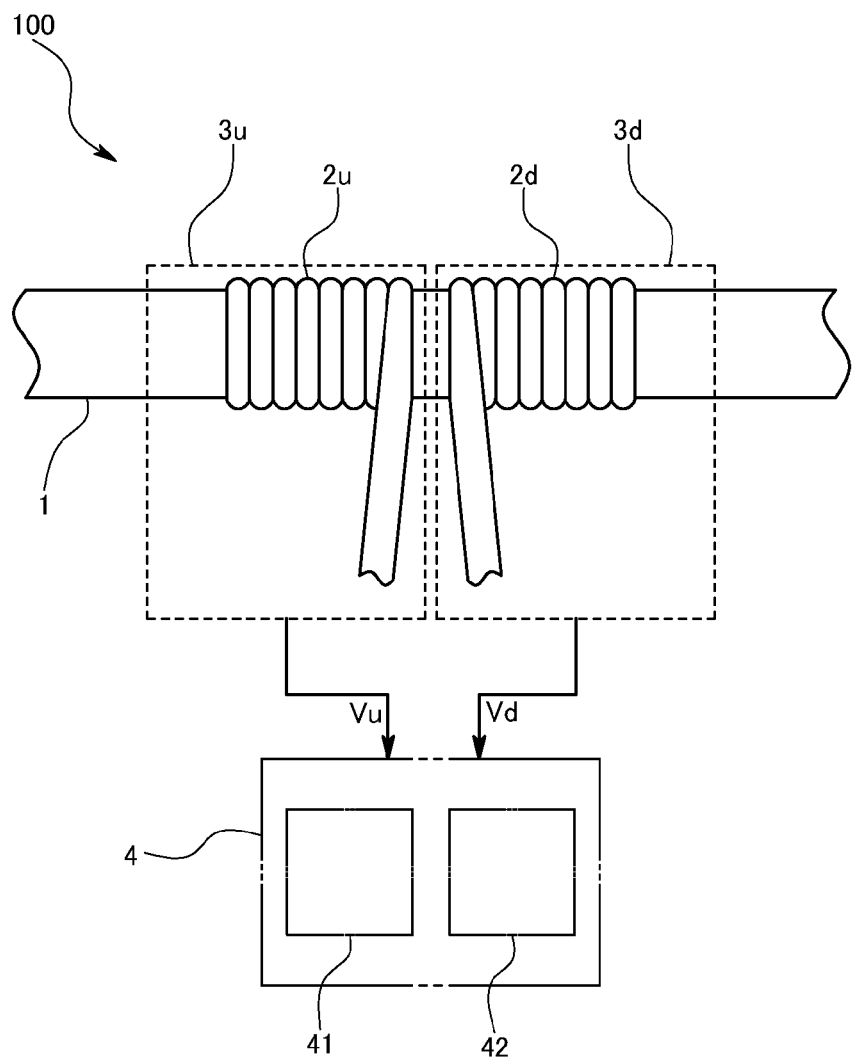
FIG. 1 is a pattern diagram of a mass flow rate sensor in accordance with one embodiment of this invention.
Figure 1:
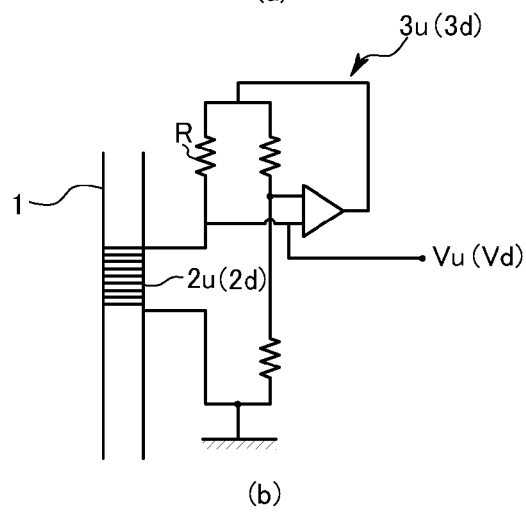

One embodiment of this invention will be explained with reference to the drawings. A mass flow rate sensor 100 as being one kind of a mass flow rate sensor of this embodiment, as shown in FIG. 1, comprises resistive elements 2u, 2d each of which is independent from one another and that are arranged in the upstream side and the downstream side of a pipe 1 where a fluid such as a gas flows, constant temperature control circuits 3u, 3d each of which is independent from one another and that apply voltage to the resistive elements 2u, 2d so as to keep the resistive elements 2u, 2d at a constant temperature, and a calculation part 4 that conducts each calculation based on the voltage applied to each of the resistive elements 2u, 2d. The calculation part 4 comprises a mass flow rate calculation part 41 that calculates at least a mass flow rate and a temperature calculation part 42 that calculates an ambient temperature of the mass flow rate sensor 100.

Each of the resistive elements $2u$, $2d$ is a thermosensitive coil of a self-heating type that is wound around the pipe 1 in the upstream side and the downstream side respectively as shown in FIG. 1(a). In the following explanation, the resistive element $2u$ arranged in the upstream side is referred to as the upstream side coil $2u$, and the resistive element $2d$ arranged in the downstream side is referred to as the downstream side coil $2d$. Each of the upstream side coil $2u$ and the downstream side coil $2d$ is made of a resistance line such as an iron-nickel alloy having a large temperature coefficient, and is so configured to detect a change of a mass flow rate of the fluid flowing in the pipe 1, even if the change is subtle.

In addition, the upstream side coil $2u$ and the downstream side coil $2d$ constitute a part of the two constant temperature control circuits $3u$, $3d$ each of which is independent respectively. Hereinafter the constant temperature control circuit that contains the upstream side coil $2u$ is also called the upstream side constant temperature control circuit $3u$ and the constant temperature control circuit that contains the downstream side coil $2d$ is also called the downstream side constant temperature control circuit $3d$.

Each of the constant temperature control circuits $3u$, $3d$ is a bridge circuit as shown in FIG. 1 (b), and controls the temperature of each coil $2u$, $2d$ to be at a predetermined temperature that is equal and constant respectively. Concretely, a voltage applied to each of the coils $2u$, $2d$ is controlled by the bridge circuit so as to keep each coil $2u$, $2d$ at the predetermined temperature. In other words, each of the coils $2u$, $2d$ is controlled to be at a constant temperature that is the same as that of the reference resistance (R) in the bridge circuit as shown in FIG. 1 (b) and a voltage ($V_u$) and a voltage ($V_d$) required for this time are measured. At a time when no fluid flows, the voltage ($V_u$) becomes equal to the voltage ($V_d$) so that a sensor output becomes zero. At a time when a fluid flows, the voltage ($V_u$) increases because the upstream side coil $2u$ is deprived of heat by the fluid, and the voltage ($V_d$) decreases because the downstream side coil $2d$ is given heat conveyed from the upstream side by the fluid. As a result of this, it is possible to measure the flow rate based on the values of these voltages ($V_u$) and ($V_d$). Accuracy in calculation of the flow rate is improved if the temperature of the coil $2u$ and the temperature of the coil $2d$ are kept constant at the same temperature, however, it is acceptable that the temperature of the coil $2u$ is different from the temperature of the coil $2d$ as long as they are kept constant.

The calculation part 4 is, so called, a computer having a CPU, a memory, an I/O channel and an AD convertor, and functions at least as the mass flow rate calculation part 41 and the temperature calculation part 42. The mass flow rate calculation part 41 corresponds to the flow rate calculation part in claims, and calculates a mass flow rate of a fluid flowing in the pipe 1 based on the output from each of the constant temperature control circuits $3u$, $3d$. More concretely, the mass flow rate (Q) is calculated based on the expression [Expression 5] by the use of the voltage $V_u$ applied to the upstream side coil $2u$ and the voltage $V_d$ applied to the downstream side coil $2d$.

$$Q = \left\{ \frac{V_u - V_d}{V_u + V_d X_d / X_u} \left[ 1 + a\left( \frac{V_u + V_d X_d / X_u}{V_{ut} + V_{dt} X_{dt} / X_{ut}} \right) \right] + OFS \right\} SENSx \quad \text{[Expression 5]}$$

Furthermore, $X_d/X_u$ satisfies the following expression [Expression 6].

$$\left| \frac{dV_u}{dQ} \right| \cong \left| \frac{d(V_d X_d / X_u)}{dQ} \right| \quad \text{[Expression 6]}$$

where (OFS) is a zero offset function and is a function of ($V_u+V_d X_d/X_u$) expressed by OFS=$f(V_u+V_d X_d/X_u)$. A graph of a sensor output at a time when no fluid flow in the channel and $V_u+V_d X_d/X_u$ is made and the zero offset function is so set that the sensor output becomes zero in a state that no fluid flows based on the graph. In addition, (SENSx) is a calibration curve at a time when a nitrogen gas flows, and (SENSx) is a function expressed by SENSx=$f(V_u+V_d X_d/X_u)$. The calibration curve is so set that the sensor output itself indicates the mass flow rate (Q) based on at least a span as being an upper limit value measured by the sensor. $\setminus T_{ut}$ is an output at a predetermined temperature (25° C.) previously measured by the upstream side measurement temperature control circuit $3u$, $V_{dt}$ is an output at a predetermined temperature (25° C.) previously measured by the downstream side measurement temperature control circuit $3d$, and $X_{dt}/X_{ut}$ satisfies the above-mentioned [Expression 6] with regard to $V_{ut}$, $V_{dt}$. In addition, (a) is a proportionality constant (a fixed value) that varies in accordance with gas type, and the same value is used for (a) irrespective of an individual difference of the mass flow rate sensor 100.

Each term of the expression [Expression 5] will be explained qualitatively. $(V_u-V_d)/(V_u+V_d X_d/X_u)$ is a normalized output from each constant temperature control circuit $3u$, $3d$ so as hardly to change relative to the ambient temperature change, and is a value generally proportional to the mass flow rate (Q). In addition, $(V_u+V_d X_d/X_u) (V_{ut}+V_{dt} X_{dt}/X_{ut})$ indicates an increase or decrease in the amount of the ambient temperature, and a term of $(1+a (V_u+V_d X_d/X_u) (V_{ut}+V_{dt} X_{dt}/X_{ut})$ is further to correct a change in the sensor output relative to the change of the ambient temperature in accordance with the increase or decrease in the amount of the ambient temperature.

Figure 2:
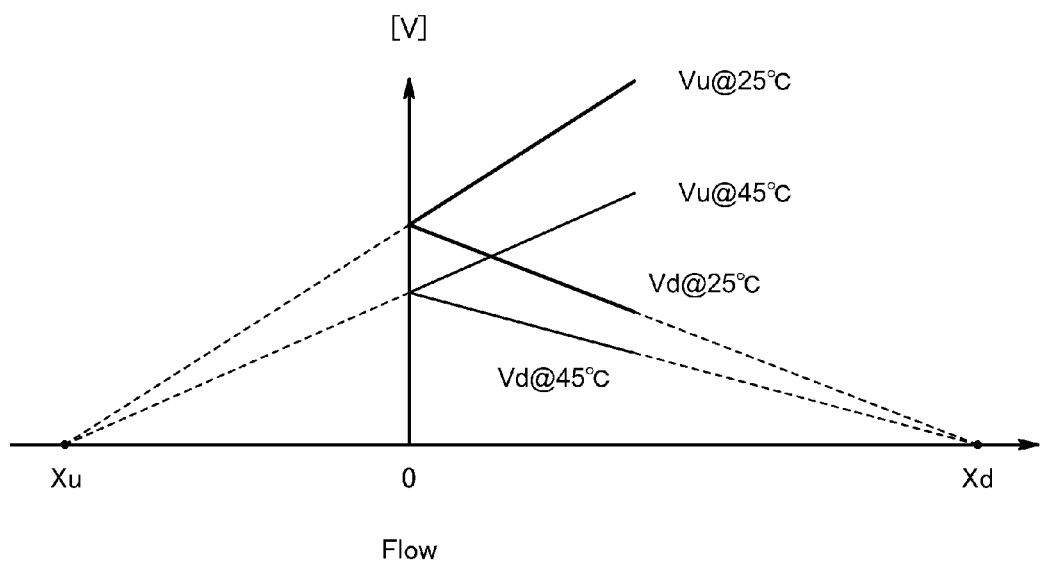
FIG. 2 is a pattern graph showing a relationship between a temperature change and an output of each constant temperature control circuit in this embodiment.

Next, a method for setting $X_d/X_u$ that satisfies the expression [Expression 6] will be explained. FIG. 2 is a graph showing a relationship between the voltage ($V_u$), ($V_d$) that is applied to each coil $2u$, $2d$ and that is the output of each constant temperature control circuit and the mass flow rate (Q), wherein the voltage (V) is expressed on the vertical axis, and the mass flow rate (Q) of the fluid flowing in the pipe 1 is expressed on the horizontal axis. Each graph of these voltages ($V_u$), ($V_d$) is extrapolated and each of the absolute values of the mass flow rate (Q) at points (intersecting points of each voltage ($V_u$), ($V_d$) with the horizontal axis) where the voltage becomes zero is set as $X_u$ and $X_d$ respectively. In this embodiment, $X_u$ and $X_d$ are previously determined experimentally from the applied voltage ($V_u$), ($V_d$) previously measured at a certain temperature by the use of the above-mentioned method and memorized in the above-mentioned memory. As shown in FIG. 2, since it is experimentally verified that each of $X_u$ and $X_d$ generally takes a constant value respectively as shown by each graph at 25° C. and 45° C. in FIG. 2, even though the ambient temperature differs, it is possible to apply $X_u$ and $X_d$ also to other, temperatures if $X_u$ and $X_d$ are obtained at a certain temperature.

The temperature calculation part 42 outputs a temperature by making use of $V_u+V_d X_d/X_u$ as a temperature index. Concretely, $V_u+V_d X_d/X_u$ hardly changes relative to a change of the mass flow rate (Q) and generally takes a doubled value of a value at the intersecting point (a section) with the vertical axis in FIG. 2. As shown in FIG. 2, the value of the section changes in accordance with the ambient temperature, and it is experimentally verified that there is a proportionality relation between the value of the section and the ambient temperature. Accordingly, in this embodiment, $V_u+V_dX_d/X_u$ and the ambient temperature are previously positioned based on the proportionality relation and its calibration curve is memorized in the memory.

A measurement accuracy of the mass flow rate sensor 100 of this embodiment having the above arrangement will be explained by comparing with a conventional measurement accuracy of the mass flow rate sensor 100 that calculates the mass flow rate (Q) based on a value of $(V_u-V_d)/(V_u+V_d)$.

Figure 3:
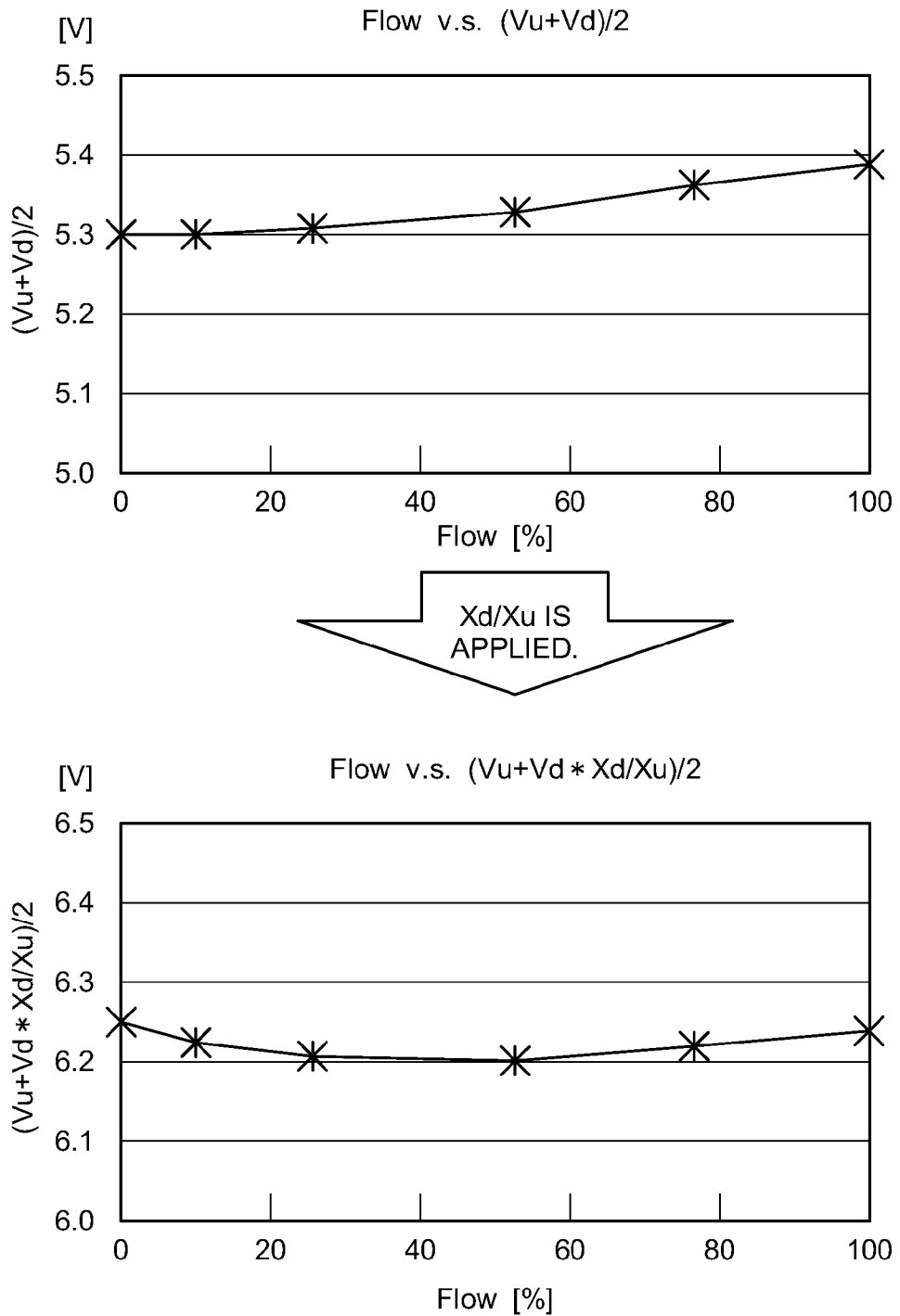
FIG. 3 is a graph showing a change of a temperature index relative to a change of a mass flow rate in this embodiment.

First, a dependency of the value of $V_u+V_d$ and a value of $V_dX_d/X_u$ relative to a change of the mass flow rate (Q) will be examined. FIG. 3 is a graph wherein $(V_u+V_d)/2$ or $(V_u+V_dX_d/X_u)/2$ is expressed on the vertical axis and a ratio of the mass flow rate (Q) for a full scale is expressed on the horizontal axis. As shown in the upper part of FIG. 3, in a case of $V_u+V_d$ in the conventional method, $(V_u+V_d)/2$ increases as the mass flow rate (Q) increases and a fluctuation of about 0.1 V is generated. Contrarily, as shown in the lower part of FIG. 3, in a case that $(V_u+V_dX_d/X_u)/2$ is applied, $(V_u+V_dX_d/X_u)/2$ hardly changes relative to the mass flow rate (Q) and a fluctuation of only about 0.03 V is generated. Accordingly, it can be conceived that it is difficult for $V_u+V_dX_d/X_u$ to be affected by the mass flow rate (Q) compared with $V_u+V_d$, and $V_u+V_dX_d/X_u$ is a value that changes largely only according to the ambient temperature. In other words, it can be said that $V_u+V_dX_d/X_u$ has a characteristic that is more preferable for improving linearity of the sensor output by correcting a change of the voltage $V_u$, $V_d$ applied to each coil 2u, 2d relative to the ambient temperature.

Figure 4:
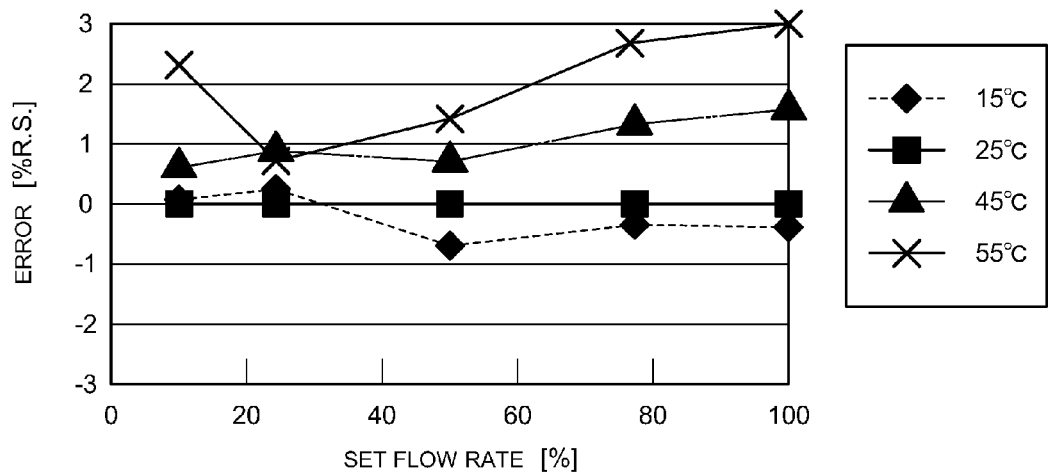
FIG. 4 is a graph showing a measurement accuracy relative to the temperature change of the mass flow rate sensor and a change of the mass flow rate in this embodiment.
Figure 4:
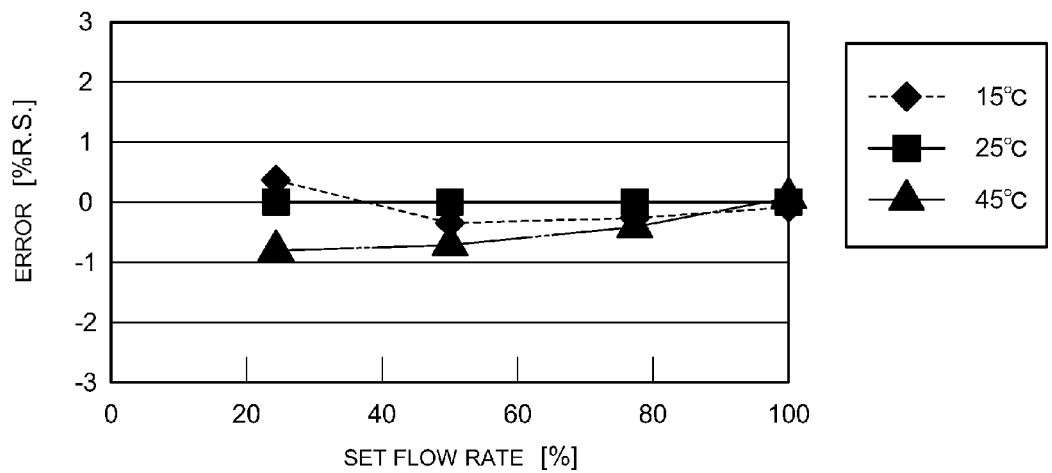
Figure 5:
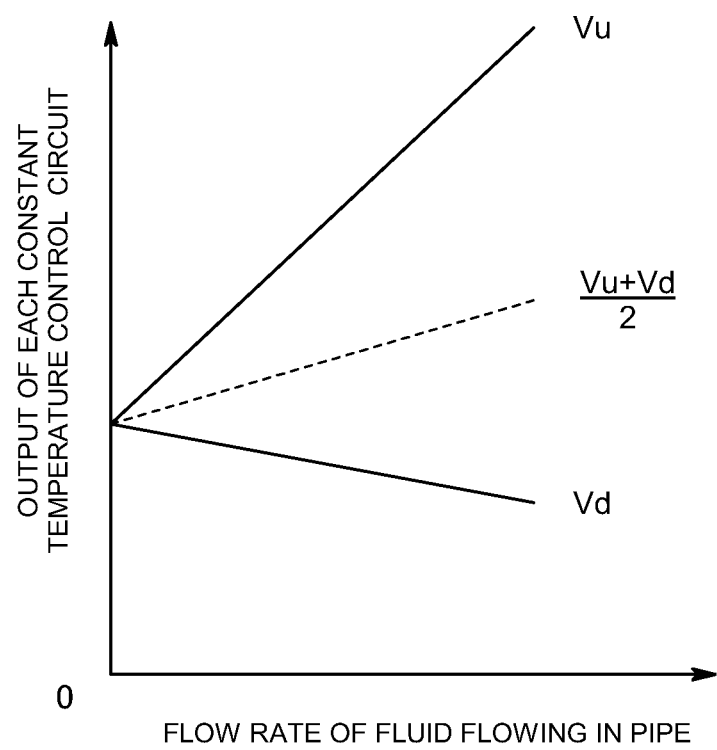
FIG. 5 is a graph showing an output characteristic of each constant temperature control circuit of an ordinary flow rate sensor.

Next, a previously determined amount of the mass flow rate (Q) flows in the pipe 1 by the use of the mass flow controller and an error of the sensor output in the conventional method and an error of the sensor output in this embodiment are shown in a graph in FIG. 4 respectively. FIG. 4 is a graph, wherein a percent error of the output from the mass flow rate sensor 100 to the mass flow rate (Q) actually flowing in the pipe 1 is expressed on the vertical axis and the mass flow rate (Q) that is so set to flow in pipe 1 is expressed on the horizontal axis. As shown in the upper part of FIG. 4, it turns out that the higher the ambient temperature becomes, the larger the error of temperature of the mass flow rate sensor 100 of the conventional method becomes, and an error of 0.8%~1.6% generates at a time when the ambient temperature is 45° C. and an influence from the mass flow rate (Q) of the fluid flowing in the pipe 1 is exerted as well. Meanwhile, in accordance with the method of this embodiment, even in a worst case scenario, only an error of about 0.8% is generated, and as a result as compared with the conventional approaches the method of the present embodiment is more resistant to the effects of the ambient temperature, and is furthermore not much influenced by a change of the mass flow rate (Q) flowing in the pipe 1. As a result, the mass flow rate sensor 100 of this embodiment is resilient against changes in the ambient temperature and changes in the mass flow rate (Q) and represents a considerable improvement as compared to conventional methods.

As described above, it can be conceived that it is because $V_u+V_dX_d/X_u$ hardly changes relative to the mass flow rate (Q) and changes largely relative to the ambient temperature that is used for correction of the output as the temperature index and that correction of the output at the zero point that has not been considered much is also conducted by the use of a function using the temperature index $V_u+V_dX_d/X_u$.

As mentioned, in accordance with the mass flow rate sensor 100 of this embodiment, since $V_u+V_dX_d/X_u$ is used for correction of the sensor output, it is possible to correct the change rate (the gradient) of the sensor output relative to the change of the ambient temperature without being affected by an influence of the change of the mass flow rate (Q) much. In addition to this, since correction of the zero point output (the shift amount) that conventionally changes in accordance with the ambient temperature change is conducted by the zero offset function (OFS) as being the function of $V_u+V_dX_d/X_u$ and the temperature dependency that still remains after the above-mentioned correction is corrected by the term of $(1+a(V_u+V_dX_d/X_u)/(V_{ut}+V_{dt}X_{dt}/X_{ut}))$, it is possible to further make the mass flow rate sensor 100 more accurate.

In addition, it is possible for the temperature calculation part 42 to output an accurate temperature just by the voltage applied to each coil 2u, 2d with using $V_u+V_dX_d/X_u$ that is hardly affected by the change of the mass flow rate (Q) as the temperature index without adding an additional temperature sensor. As a result of this, since there is no need to use the additional temperature sensor, it is possible to conduct the temperature measurement without any cost increase and also to use the measured temperature for other corrections.

Other embodiments will be explained below.
In the above-mentioned embodiment, a graph between the voltage applied to each coil and the mass flow rate (Q) is extrapolate and $X_d$ and $X_u$ are obtained from the mass flow rate (Q) at the point where the voltage becomes zero, however, they may be calculated by the use of another method. For example, the gradient ($a_u$) of the voltage ($V_u$) applied to the upstream side coil and the gradient ($a_d$) of the voltage ($V_d$) applied to the downstream side coil may be obtained respectively and $X_d=a_u$ and $X_u=a_d$ may be used. In short, it is acceptable as far as the value generally satisfies the above-mentioned expression [Expression 6]. In addition, in a case that $X_u/X_d$ is determined by the above-mentioned method, it is not necessary for the mass flow rate (Q) to satisfy the expression [Expression 6] for the entire zone, and it may be acceptable as far as the expression [Expression 6] is satisfied at least in a zone to be used.

In the above-mentioned embodiment, the mass flow rate calculation part calculates the mass flow rate (Q) by the use of the expression [Expression 5], however, the mass flow rate (Q) may be calculated by the use of the following expression [Expression 7] depending on the accuracy to be obtained.

$$Q = \left( \frac{V_u - V_d}{V_u + V_dX_d/X_u} + OFS \right) SENSx \qquad \text{[Expression 7]}$$

In addition, for the expression [Expression 7] it is acceptable that at least one of the zero offset function (OFS) and the calibration curve (SENSx) is a function of $V_u+V_dX_d/X_u$. The mass flow rate sensor may not be provided with the temperature calculation part arranged in the above-mentioned embodiment.

In the above-mentioned embodiment, the sensor output is made to be less temperature influenced by dividing with $V_u+V_dX_d/X_u$, however, since there is a difference between the output at a time when the mass flow rate (Q) is zero measured by the mass flow rate of the above-mentioned embodiment and the output at a time when the mass flow rate (Q) is zero measured by the conventional mass flow rate sensor where the sensor output is divided by $V_u+V_d$, users who use the conventional mass flow rate sensor might be confused. In order to avoid a user's confusion and to make it possible to output the same sensor output as that of the conventional arrangement at a time of no flow and to avoid an influence on the ambient temperature change similar to the above-mentioned embodiment, the sensor output may be divided by the following expression [Expression 8] instead of $V_u+V_dX_d/X_u$.

$$2\left[V_u - \frac{\frac{X_d}{X_u}(V_u-V_d)}{1+\frac{X_d}{X_u}}\right] = \frac{2}{1+X_d/X_u}(V_u+V_dX_d/X_u) \quad \text{[Expression 8]}$$

In other words, instead of $V_u+V_dX_d/X_u$, the sensor output may be divided by $V_u+V_dX_d/X_u$ multiplied by a coefficient $2/(1+X_d/X_u)$.

In the above mentioned embodiment, the calibration curve (SENSx) is used, however, it may be a coefficient or a function that converts a calculation value of an output from each constant temperature control circuit into the mass flow rate (Q).

The mass flow rate (Q) output from the sensor may be further corrected by a different correction expression. For example, in a case that there is no linearity between the sensor output and the actual mass flow rate (Q) at a value between the zero flow rate and the measurable upper limit value, the sensor output may be corrected by a quintic correction equation.

In a case of intending to make it possible to measure a flow in a small flow rate with improving the sensitivity of the flow rate sensor, $V_u$ may be multiplied by a constant value so as to output the value of $V_u-V_d$ at a large value. In this case, the value such as the calibration curve may be changed to correspond to the change.

In addition, the embodiment may be variously modified or the embodiments may be combined without departing from a spirit of the invention.

INDUSTRIAL APPLICABILITY

In accordance with the flow rate sensor of this invention, the increasing rate (the gradient) of the output of the flow rate sensor can be corrected not to change relative to the ambient temperature change and the non-linearity resulting from the change of the flow rate (Q) relative to the output of the flow rate sensor can be prevented from being added by $V_u+V_dX_d/X_u$ that hardly changes relative to the flow rate change and largely changes relative to the ambient temperature change. Furthermore, the zero point output is also corrected by the zero offset function (OFS) as being the function of $V_u+V_dX_d/X_u$ so that it is possible to prevent variation of the shift amount depending on the temperature. Accordingly, it is possible to make the highly accurate flow rate sensor that is difficult to be affected by not only the ambient temperature change of the flow rate sensor but also the flow rate change.

EXPLANATION OF REFERENCE CHARACTERS

100 . . . flow rate sensor
1 . . . pipe
2u, 2d . . . resistive element (coil)
3u, 3d . . . constant temperature control circuit
41 . . . flow rate calculation part
42 . . . temperature calculation part

The invention claimed is:

1. A flow rate sensor wherein two resistive elements whose resistance values change in accordance with a temperature of a fluid are arranged in an upstream side and a downstream side in a channel where the fluid flows, and two constant temperature control circuits each of which contains these resistive elements respectively are arranged so that a temperature of the resistive elements is controlled at a constant by the constant temperature control circuits, the flow rate sensor comprising:
a flow rate calculation part that calculates a flow rate (Q) of the fluid based on an expression (Expression 2) using $X_d/X_u$ that satisfies an expression (Expression 1) at least within a range of the flow rate (Q) when an output of the constant temperature control circuit corresponding to the upstream resistive element is defined as $V_u$, an output of the constant temperature control circuit corresponding to the downstream resistive element is defined as $V_d$, and the flow rate of the fluid is defined as (Q), wherein the flow rate calculation part corrects a zero point output as being an output when the flow rate (Q) is zero by using a zero offset function (OFS) defined as a function of $V_u+V_dX_d/X_u$ $$\left|\frac{dV_u}{dQ}\right| \cong \left|\frac{d(V_dX_d/X_u)}{dQ}\right| \quad \text{[Expression 1]}$$

$$Q = \left(\frac{V_u-V_d}{V_u+V_dX_d/X_u} + OFS\right)SENSx \quad \text{[Expression 2]}$$

where (OFS) is the zero offset function, and (SENSx) is a conversion function that converts a calculation value of an output from each constant temperature control circuit into a flow rate.

2. The flow rate sensor described in claim 1, wherein the flow rate calculation part calculates the flow rate (Q) by the use of the conversion function (SENSx) defined as a function of $V_u+V_dX_d/X_u$.

3. The flow rate sensor described in claim 1, wherein the flow rate calculation part calculates the flow rate (Q) based on an expression [Expression 4] wherein a temperature correction term is further added to the expression $$Q = \left\{\frac{\frac{V_u-V_d}{V_u+V_dX_d/X_u}}{\left[1+a\left(\frac{V_u+V_dX_d/X_u}{V_{ut}+V_{dt}X_{dt}/X_{ut}}\right)\right]+OFS}\right\}SENSx \quad \text{[Expression 4]}$$

where $V_{ut}$ is an output at a previously measured predetermined temperature of the constant temperature control circuit corresponding to the upstream resistive element, $V_{dt}$ is an output at a previously measured predetermined temperature of the constant temperature control circuit corresponding to the downstream resistive element, and $X_{dt}/X_{ut}$ satisfies the expression [Expression 1] regarding $V_{ut}$ and $V_{dt}$.

4. The flow rate sensor described in claim 1, wherein the conversion function (SENSx) is a calibration curve.

5. The flow rate sensor described in claim 1,
further comprising a temperature calculation part that calculates an ambient temperature based on $V_u+V_dX_d/X_u$.

* * * * *